US009057622B2

(12) United States Patent
Pfeifle

(10) Patent No.: US 9,057,622 B2
(45) Date of Patent: Jun. 16, 2015

(54) METHOD AND SYSTEM FOR ROUTING USING UNCERTAINTY DATA

(75) Inventor: Martin Pfeifle, Seewald (DE)

(73) Assignee: HERE Global B.V., Veldhoven (NL)

( * ) Notice: Subject to any disclaimer, the term of this patent is extended or adjusted under 35 U.S.C. 154(b) by 325 days.

(21) Appl. No.: 13/368,934

(22) Filed: Feb. 8, 2012

(65) Prior Publication Data
US 2013/0204525 A1 Aug. 8, 2013

(51) Int. Cl.
*G01C 21/34* (2006.01)
*G08G 1/0962* (2006.01)
*G08G 1/0968* (2006.01)

(52) U.S. Cl.
CPC ........ *G01C 21/3492* (2013.01); *G01C 21/3446* (2013.01); *G01C 21/3469* (2013.01); *G08G 1/09626* (2013.01); *G08G 1/096827* (2013.01)

(58) Field of Classification Search
CPC ........ G01C 21/28; G01C 21/30; G01C 21/34; G01C 21/3407; G01C 21/3415; G01C 21/3423; G01C 21/343; G01C 21/3438; G01C 21/3446; G01C 21/3453; G01C 21/3461; G01C 21/3469; G01C 21/3476; G01C 21/3484; G01C 21/3492; G01C 21/36; G01C 21/3602; G01C 21/3605; G01C 21/3608; G01C 21/3611; G01C 21/3614; G01C 21/3617; G01C 21/362; G01C 21/3623; G01C 21/3626; G01C 21/3629; G01C 21/3632; G01C 21/3635; G01C 21/3638; G01C 21/3641; G01C 21/3644; G01C 21/3647; G01C 21/365; G01C 21/3652; G01D 1/00; G01D 1/02; G01D 1/12; G01D 1/14; G01D 1/16; G01D 1/18; G06F 17/00; G06F 17/10; G06F 17/11; G06F 17/12; G06F 17/13; G06F 17/14; G06F 17/141; G06F 17/142; G06F 17/144; G06F 17/145; G06F 17/147; G06F 17/148; G06F 17/15; G06F 17/153; G06F 17/156; G06F 17/16; G06F 17/17; G06F 17/175; G06F 17/18; G08G 1/0967; G08G 1/096708; G08G 1/096716; G08G 1/096725; G08G 1/096733; G08G 1/096741; G08G 1/09675; G08G 1/096758; G08G 1/096766; G08G 1/096775; G08G 1/096783; G08G 1/096791; G08G 1/0968; G08G 1/096805; G08G 1/096811; G08G 1/096816; G08G 1/096822; G08G 1/096827; G08G 1/096833; G08G 1/096838; G08G 1/096844; G08G 1/09685; G08G 1/096855; G08G 1/096861; G08G 1/096866
USPC ......................................... 701/400, 533, 439
See application file for complete search history.

(56) References Cited

U.S. PATENT DOCUMENTS

2003/0225508 A9 * 12/2003 Petzold et al. ................ 701/201
2004/0225437 A1 * 11/2004 Endo et al. .................... 701/209
2004/0249568 A1   12/2004 Endo et al.

(Continued)

OTHER PUBLICATIONS

Office Action and Search Report for PCT application No. PCT/EP2013/050995, mailed Jun. 3, 2013.

*Primary Examiner* — Jerrah Edwards
(74) *Attorney, Agent, or Firm* — Lempia Summerfield Katz LLC

(57) ABSTRACT

A method and system for routing using uncertainty data is disclosed. The uncertainty data is associated with geographic data. The uncertainty data includes a distribution function that represents the probability that the geographic data is accurate. A routing application uses the uncertainty data during or after route calculation. The routing application provides one or more routes and information about the routes based on the uncertainty data.

24 Claims, 4 Drawing Sheets

(56) References Cited

U.S. PATENT DOCUMENTS

| | | | |
|---|---|---|---|
| 2005/0093720 A1* | 5/2005 | Yamane et al. | 340/995.13 |
| 2006/0025925 A1* | 2/2006 | Fushiki et al. | 701/210 |
| 2010/0324815 A1* | 12/2010 | Hiruta et al. | 701/208 |
| 2011/0196817 A1* | 8/2011 | Pryakhin et al. | 706/14 |
| 2012/0029800 A1* | 2/2012 | Kluge et al. | 701/117 |
| 2013/0035812 A1* | 2/2013 | Bernard | 701/22 |
| 2013/0046456 A1* | 2/2013 | Scofield et al. | 701/117 |
| 2013/0179067 A1* | 7/2013 | Trowbridge et al. | 701/410 |

\* cited by examiner

METHOD AND SYSTEM FOR ROUTING USING UNCERTAINTY DATA

FIELD

The present invention relates generally to routing, and more particularly, relates to determining an optimal route using uncertainty data.

BACKGROUND

Navigation systems are available that provide users with various navigation-related functions and features. For example, some navigation systems are able to determine an optimum route to travel by roads between locations in a geographic region. Using input from the user, and optionally from equipment that can determine the user's physical location (such as a GPS system), a navigation system can examine various routes between two locations to determine an optimum route to travel from a starting location to a destination location in a geographic region.

To calculate an optimal route, the navigation system uses a routing algorithm. A routing algorithm searches for the route having the minimum cost. Here, cost refers to a user's preference for a route. For example, the user may desire the shortest route, the fastest route, or the most energy efficient route for traveling from an origin to a destination.

The routing algorithm uses data in a geographic database to calculate the route. The geographic database contains data that represents some of the physical geographic features in a geographic region. For example, the geographic database represents a road network using road segments and nodes. If the routing algorithm is calculating a minimum time route, the routing algorithm may retrieve road segment length and speed data (e.g., speed limit, speed range, average speed) from the geographic database. The cost per segment is the travel time, which is calculated by dividing the segment length by the speed data associated with the segment.

The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

SUMMARY

A method and system for determining an optimal route using uncertainty data is described. A route calculation algorithm may use uncertainty data to calculate the optimal route. The uncertainty data is represented by a distribution function and is used as the cost for determining the optimal route. Alternatively, the route calculation algorithm may calculate a route using another cost, such as fastest time or shortest distance. Once the route is calculated, the route calculation uses the uncertainty data to provide probability information about the route.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

A person needs to catch a train leaving in 28 minutes. There are two routes from the person's current location to the train station. One route has a fairly consistent travel time of 25 minutes, while the other route is very inconsistent and has a travel time ranging from 15-35 minutes. To provide this travel time information to the person, a navigation system uses uncertainty data associated with other data during or after route calculation.

I. Navigation System

Figure 1:
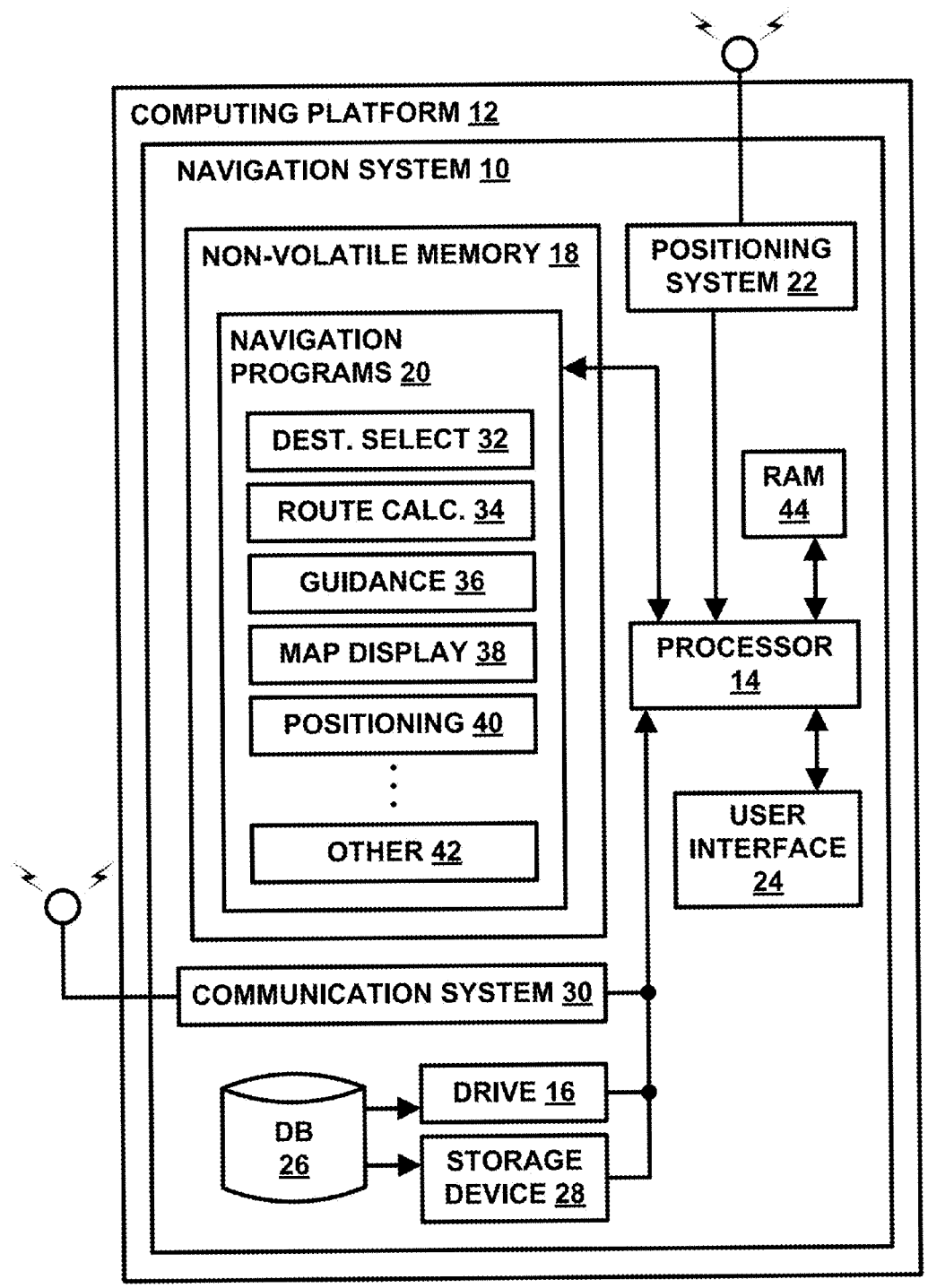
FIG. 1 is a block diagram depicting a navigation system, according to an example.

FIG. 1 is a block diagram of a navigation system 10 associated with a computing platform 12. The computing platform 12 may be associated with a vehicle. Alternatively, the computing platform 12 may be a handheld device that can be used by pedestrians in addition to passengers in a vehicle. For example, the computing platform 12 may be a mobile telephone or a tablet computer. The computing platform 12 may also be a personal computer or any other computer.

The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information. The navigation application software programs 20 may be embodied as program instructions stored on the non-volatile memory storage device 18, which when executed by the processor 14 cause the processor 14 to carry out functions as described further herein. The program instructions may be written in a suitable computer programming language, such as C, C++, Java, or any other suitable program language now known or later developed.

The navigation system 10 also includes a positioning system 22. The positioning system 22 may utilize a Global Positioning System (GPS), a dead reckoning-type system, or other systems capable of determining position. The positioning system 22 may also include suitable sensing devices that measure the traveling distance speed, direction, orientation, and so on. The positioning system 22 outputs a signal to the processor 14. The navigation application software programs 20 that run on the processor 14 use the signal from the positioning system 22 to determine the location, direction, and orientation of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one example, the geographic database 26 is stored on a storage medium, such as a CD-ROM or DVD, that is installed in the drive 16 so that the geographic database 26 can be read and used by the navigation system 10. In another example, the navigation system 10 includes a storage device 28, such as a hard disk or memory card, on which all or a portion of the geographic database 26 is stored. The geographic database 26 does not have to be physically provided at the location of the navigation system 10. In this example, some or the entire geographic database 26 may be located remotely from the rest of the navigation system 10 and portions of the geographic data provided via a communications system 30, as needed.

In one example, the navigation application software programs 20 load from the non-volatile memory storage device 18 into a random access memory (RAM) 44 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions.

The navigation application software programs 20 may include separate applications (or subprograms) that provide the various navigation-related features and functions. The navigation functions and features may include destination selection 32 (identifying one or more places to be used as a destination based on user input), route calculation 34 (determining a route from an origin to a destination), route guidance 36 (providing detailed directions for reaching a destination), map display 38, and positioning 40 (map matching). Other functions and programming 42 may be included in the navigation system 10.

II. Geographic Database

Figure 2:
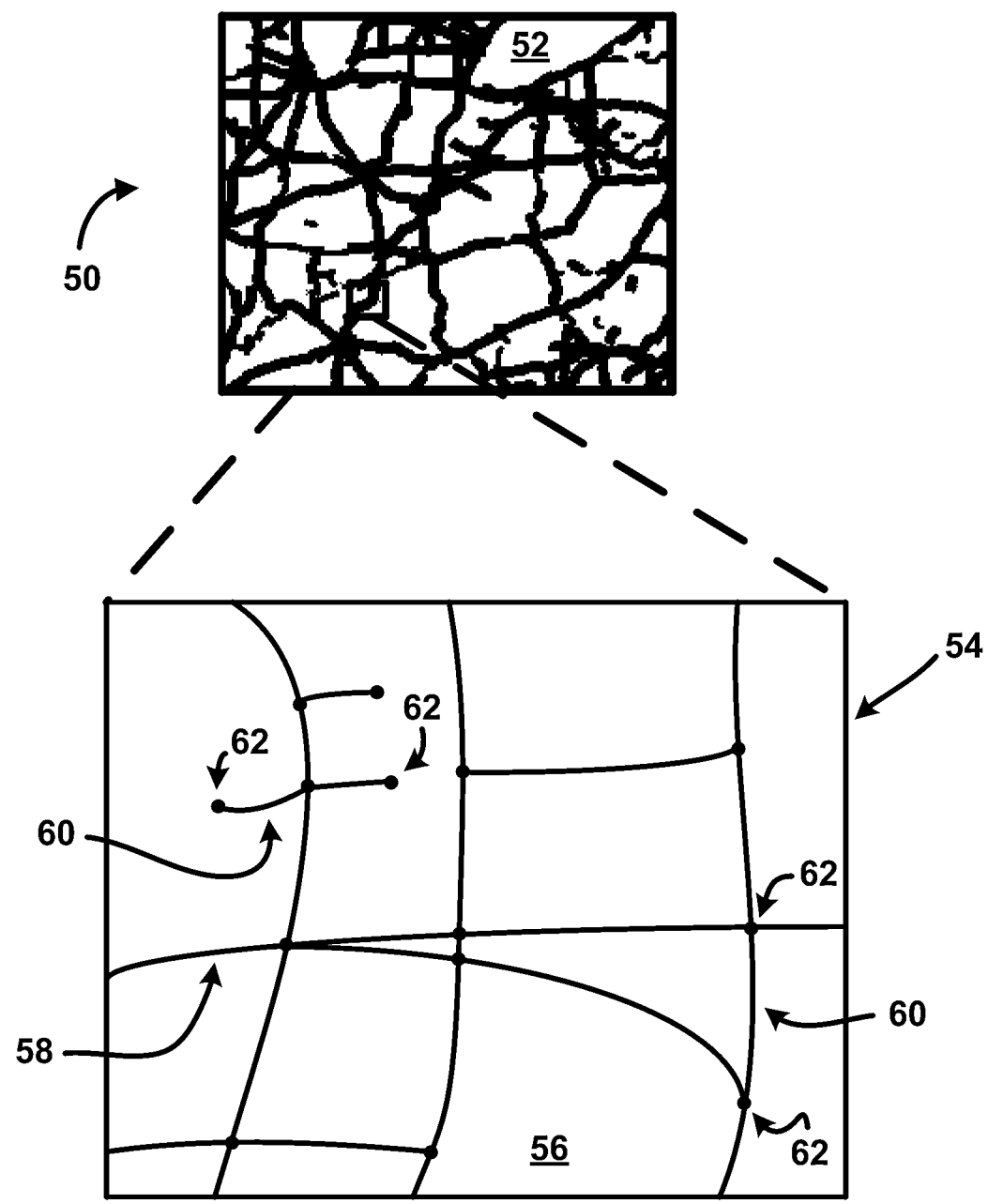
FIG. 2 depicts a map of a geographic region, according to an example.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
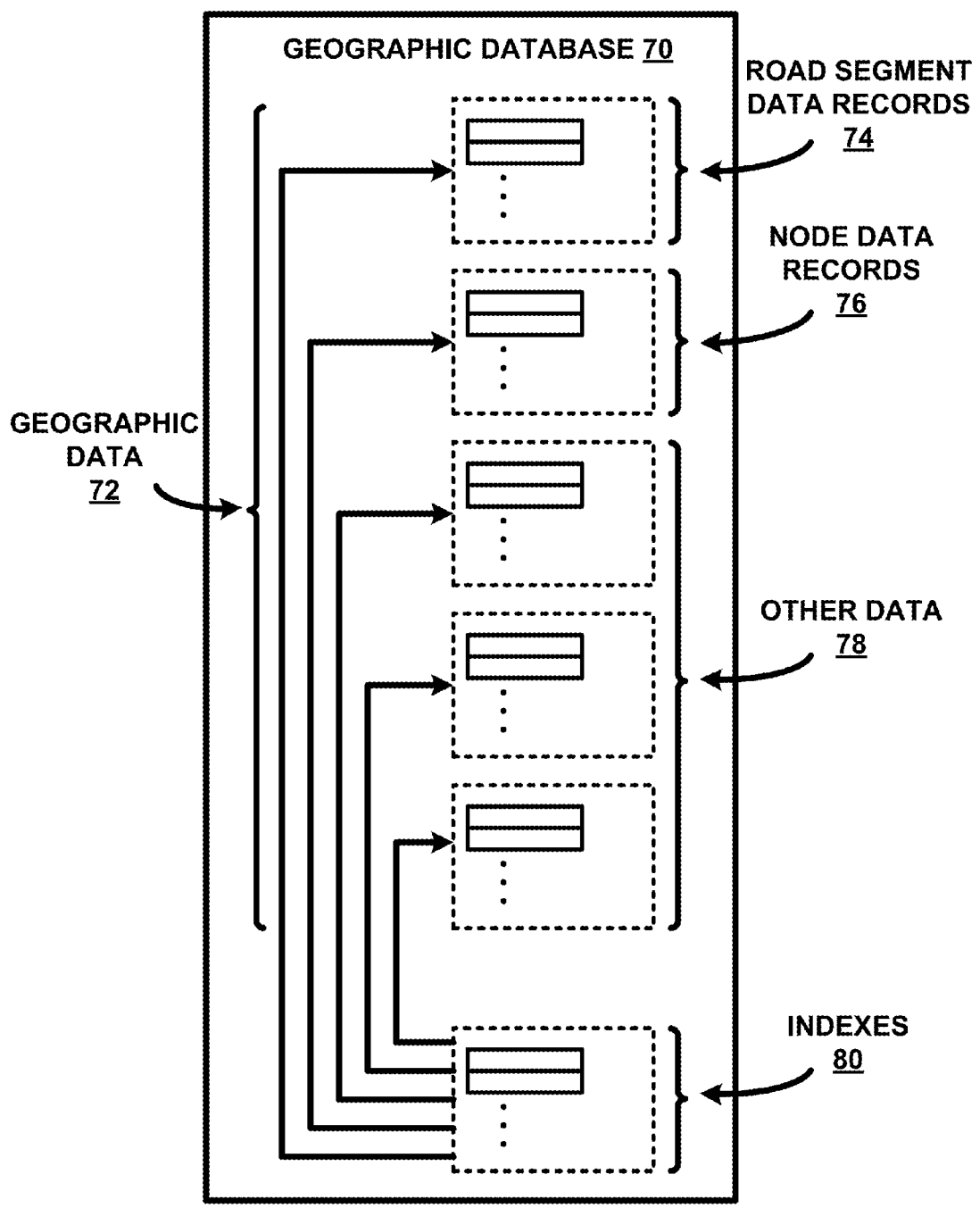
FIG. 3 is a block diagram of a geographic database that represents the geographic region of FIG. 2, according to an example.

Referring to FIG. 3, a geographic database 70 contains data 72 that represents some of the physical geographic features in the geographic region (52 in FIG. 2). The geographic database 70 may constitute all or part of the geographic database 26. For example, the geographic database 70 may be a subset of the data contained within the geographic database 26. The geographic database 70 may be accessible through the navigation system 10 and the computing platform 12. Alternatively or additionally, the geographic database 70 may be a standalone database located remotely from the geographic database 26, the navigation system 10, and/or the computing platform 12 but nonetheless accessible via the communication system 30 and/or the processor 14.

The data 72 contained in the geographic database 70 includes data that represent the road network 58. In the embodiment of FIG. 3, the geographic database 70 that represents the geographic region 52 contains at least one database record 74 (also referred to as "entity" or "entry") for each road segment 60 in the geographic region 52 in FIG. 2. The road segment data record 74 may include a segment ID by which the data record can be identified in the geographic database 70.

Each road segment data record 74 has associated with it information (such as "attributes", "fields", etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on.

The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment.

The road segment data record 74 may also include or be associated with other data that refer to various other attributes of the represented road segment. The various attributes associated with a road segment may be included in a single road segment record, or may be included in more than one type of record that are cross-referenced to each other. For example, the road segment data record 74 may include data identifying what turn restrictions exist at each of the nodes that correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The road segment data records 74 and the node data records 76 may also include or be associated with uncertainty data. The uncertainty data is described in Section III.

The geographic database 70 may also include other kinds of data 78. The other kinds of data 78 may represent other kinds of geographic features or anything else. The other kinds of data may include point of interest (POI) data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment.

The geographic database 70 also includes indexes 80. The indexes 80 may include various types of indexes that relate the different types of data to each other or that relate to other aspects of the data contained in the geographic database 70.

III. Uncertainty Data

There is some uncertainty associated with some of the data in the geographic database 70. The uncertainty may be related to attributes associated with nodes, segments, and transitions between segments. For example, some road segment data records 74 include a speed range attribute. For example, a road segment may be associated with a speed range of 40-45 miles per hour. A routing algorithm that uses a speed range to calculate a fastest travel time route may produce a route that includes some uncertainty.

For imprecise data, additional information is added to the data record. This information is referred to herein as "uncertainty data." The uncertainty data represents the probability that the data is accurate. The uncertainty data may be represented by a distribution function. The distribution function may be described using parametric functions or a sample data set.

For example, the uncertainty data may be represented by a normal (or Gaussian) distribution, which is a continuous probability distribution that has a bell-shaped probability density function. As another example, the uncertainty data may be represented by a Student's t-distribution (or simply t-distribution), which is also a continuous probability distribution that has a bell-shaped probability density function, but it has heavier tails than a normal distribution. Other distributions, such as a Chi-squared distribution, may also be used to represent the uncertainty data.

The uncertainty data may be added to various attributes of nodes, segments, and transitions between road segments, which are stored in the road segment data records 74 and/or node data records 76 in the geographic database 70. For example, if the distribution function is a normal function, the data record 74, 76 may also include a mean and variance value for an attribute of a segment or a node.

An example partial node record is shown in Table 1. In this example, there is uncertainty data associated with a height attribute (i.e., z-value) of a node. The uncertainty in the height attribute may be the result of using a digital terrain model for determining the height of the node. The mean and variance values in Table 1 define the uncertainty associated with the derived height values.

TABLE 1

| Node ID | Latitude | Longitude | Height | Mean | Variance |
|---|---|---|---|---|---|
| 746 | 36.26358 | −115.249612 | 650 | 700 | 50 |
| 932 | 41.97664 | −87.905161 | 1000 | 1010 | 65 |
| 3 | −33.873651 | 151.20689 | 1100 | 1200 | 500 |
| 50008 | 28.381646 | −81.563761 | 230 | 230 | 10 |
| 12 | 52.523405 | 13.4114 | 910 | 900 | 100 |

As another example, a road segment data record 74 may include historic traffic data, which includes historical average travel times along the segment by day of the week, time of the day, and holidays. The historic traffic data has different levels of quality due to how the data is collected and processed. Uncertainty data is associated with the historic traffic data, preferably for each time period included in the historic traffic data.

As yet another example, a road segment data record 74 may include a slope value that describes the slope of the road segment. The slope data may be collected while data collection vehicles travel on the road segment. However, the slope data may not be field collected for all roads. The map developer may determine the slope of some roads using digital terrain information, which contains height data for the roads. The uncertainty data is associated with the slope data. The uncertainty data reflects more uncertainty for slopes calculated from the digital terrain information than for the slopes measured in the field.

As yet another example, a node record 76 may include time to cross an intersection (i.e., waiting time). For example, a traffic light may be located at a node and the time to cross may vary from zero seconds (light is green) to one or more minutes (light just turned red). The uncertainty data may also be assigned to link-node-link combinations, which expresses the uncertainty for turning left or right at an intersection.

The uncertainty data may be added to other records in the geographic database 70 as well. For example, the uncertainty data may be associated with public transportation data (e.g., train or bus schedule data). As another example, the uncertainty data may be associated with speed categories, which provides an average speed per segment regardless of time or day.

The uncertainty data may also be added to data received at the navigation system 10. For example, in some areas, systems broadcast data messages that contain up-to-the-minute reports of traffic and road condition information. In North America, the Radio Broadcast Data System (RBDS) broadcasts traffic messages using the Traffic Message Channel (TMC) protocol. The navigation system 10 may receive TMC messages via the communications system 30.

For example, the RBDS may broadcast a traffic message that identifies a traffic jam with a mean value of thirty minutes and a standard deviation value that reflects the quality of the source data. If the source of the data is reliable, e.g., the police department, the standard deviation value may be relatively small. If the source of data is unreliable, e.g., a call from a commuter stuck in the jam, the standard deviation value may be relatively large.

The uncertainty data may be generated in a variety of ways. If sample data is available, the mean and standard deviation may be calculated using the sample data. For example, large amounts of traffic speed data may be collected to produce the historic traffic data.

A distribution function may be assigned to some types of geographic data. For example, the field collected slope data and digital terrain data may have a known error distribution. With the traffic messages, the RBDS may assign different standard deviations based on the data source. Other methods may be used as well.

The uncertainty data may also be generated on the navigation system 10. For example, the navigation system 10 determines that there is a traffic light located on a road segment at a distance ahead of the vehicle. The navigation system 10 generates uncertainty data based on the uncertainty of how long the traffic light will be red. For example, the navigation system 10 generates uncertainty data using a distribution function with a mean value of 30 seconds and a standard deviation of 15 seconds. Of course, other values may be used.

IV. Routing With Uncertainty Data

The uncertainty data may be used to compute the likelihood of reaching a destination by a certain time. The uncertainty data also may be used to compute the likelihood that route A is faster than route B. The uncertainty data also may be used to provide a distribution function to the user as opposed to a single value for travel time or estimated arrival time. The uncertainty data may be used to provide additional information to a user of the navigation system 10.

The uncertainty data may be considered after a route has been calculated or during route calculation.

a. Using Uncertainty Data after a Route has been Calculated

In this example, the route calculation application 34 has calculated a route from an origin to a destination. The route calculation application 34 may use any suitable routing algorithm, such as Dijkstra and A*. The route includes a sequence of road segments connecting the origin to the destination. The route calculation application 34 may retrieve a distribution function (i.e., uncertainty data) for each of the segments in the route from the geographic database 70.

Using the distribution functions, the route calculation application 34 may determine travel time. In the example of a normal distribution, the travel time may be calculated by adding the mean values and variance values of the probability density functions of the travel times on the segments. For example, if a calculated route has two road segments and the first road segment has a probability density function P(x) and the second road segment has a probability density function P(y), the sum is:

$$P_{x+y}(\mu) = \frac{1}{\sqrt{2\pi(\sigma_x^2 + \sigma_y^2)}} e^{-[\mu-(\mu_x+\mu_y)]^2/[2(\sigma_x^2+\sigma_y^2)]}$$

where $\mu$ is the mean, $\sigma^2$ is the variance, and $\sigma$ is the standard deviation. The sum of two normal distributions is another normal distribution having a mean value equal to the sum of the two mean values ($\mu_{x+y}=\mu_x+\mu_y$) and a variance equal to the sum of the two variances ($\sigma_{x+y}^2=\sigma_x^2+\sigma_y^2$).

Using the probability density functions, the route calculation application 34 may also determine arrival time. The arrival time, also referred to an expected time of arrival (ETA), can be expressed by the density distribution function that results from adding the density distribution of all links on the route path. The cumulative distribution function describes probability of a random variable falling in the interval ($-\infty$, x) and can be computed as an integral of the probability density function as follows.

$$D(T) = \int_{-\infty}^{x} P(x)dx = \frac{1}{\sigma\sqrt{2\pi}} \int_{-\infty}^{x} e^{-(x-\mu)^2/(2\sigma^2)}dx = \frac{1}{2}\left[1 + \text{erf}\left(\frac{x-\mu}{\sigma\sqrt{2}}\right)\right]$$

The value D(T) reflects the probability of arriving at the destination prior to time T.

Using the probability density functions, the route calculation application 34 may also determine whether one route is faster than another. As previously described, normal distributions may be added. Normal distributions can also be subtracted from each other. If the first route has a probability density function P(x) and the second route has a probability density function P(y), the difference is:

$$P_{x-y}(\mu) = \frac{1}{\sqrt{2\pi(\sigma_x^2 + \sigma_y^2)}} e^{-[\mu-(\mu_x-\mu_y)]^2/[2(\sigma_x^2+\sigma_y^2)]}$$

where this normal distribution has a mean value equal to ($\mu_{x-y}=\mu_x-\mu_y$) and a variance equal to ($\sigma_{x-y}^2=\sigma_x^2+\sigma_y^2$). The value of $P_{x-y}(0)$ describes the probability value that route x is faster than route y. Similarly, the value $P_{y-x}(0)$ describes the probability value that route y is faster than route x.

The route calculation application 34 may provide the travel time, estimated time of arrival, route comparison information, along with the probability information, to the route guidance application 36 and/or the map display application 38. The route guidance application 36 and/or the map display application 38 may then provide this information to the user via the user interface 24. For example, the user interface 24 may display the distribution function as a bell curve.

b. Using Uncertainty Data During Route Calculation

The uncertainty data may also be considered during route calculation. A route calculation algorithm may calculate a route that optimizes the probability of being at a certain time at a certain destination. The route calculation algorithm may also calculate a route for reaching a certain destination with a certain amount of fuel.

Assume a user of the navigation system 10 wants to be at a train station within ten minutes. The route calculation algorithm uses ten minutes as the maximum allowed cost ($C_{max}=10$). The route calculation algorithm calculates a probability value to be at the train station in ten minutes. The user then takes the route that has the highest probability value for arriving at the train station in ten minutes.

Figure 4:
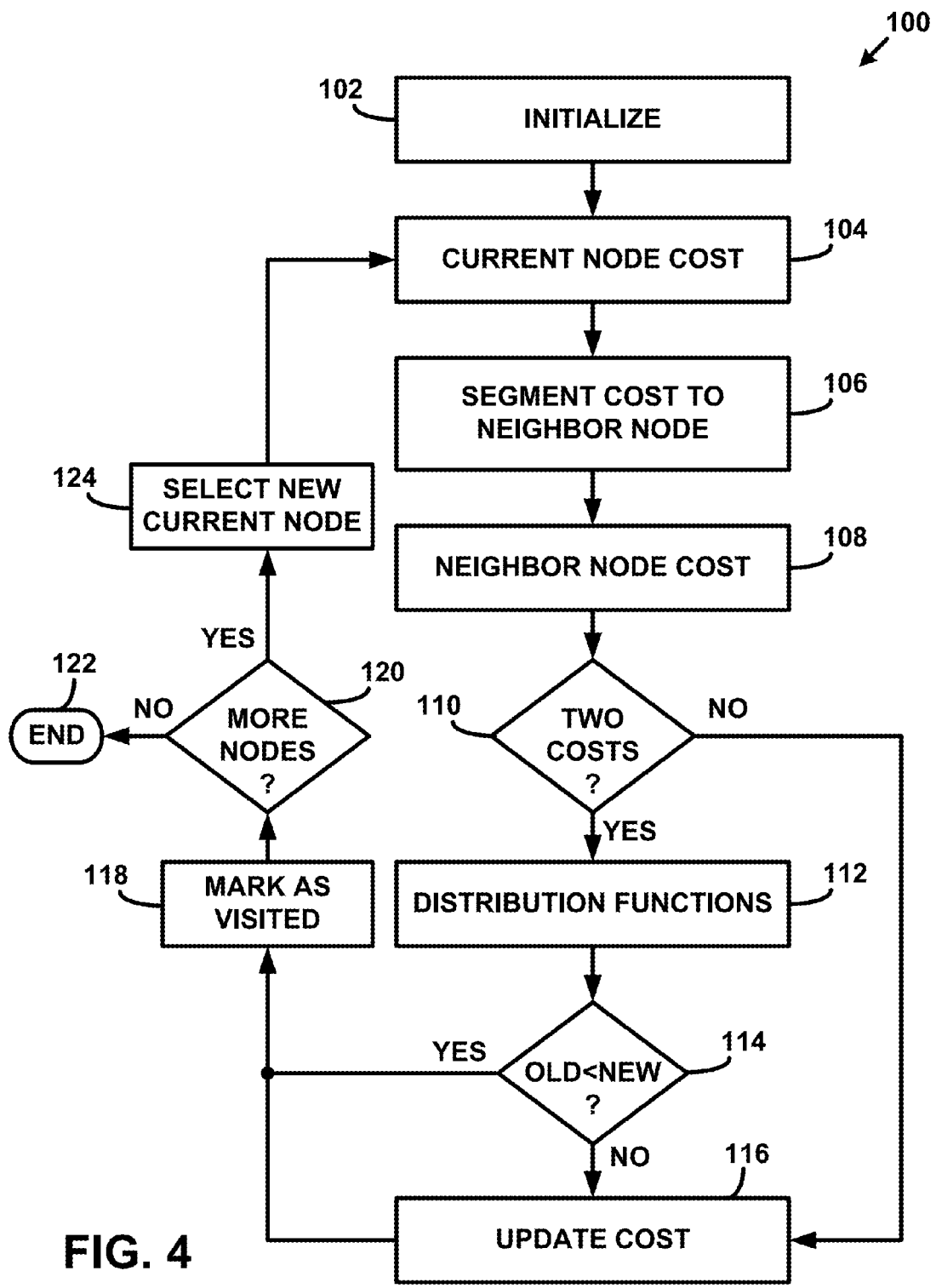
FIG. 4 is a flow diagram of a route calculation algorithm, according to an example.

FIG. 4 is a flow diagram of a route calculation algorithm 100. The route calculation algorithm 100 starts after a user of the navigation system 10 enters a destination and possibly an origin for a route into the user interface 24. The navigation system 10 may also use the positioning system 22 to determine the user's current position, which the route calculation algorithm 100 may use as the route origin.

At block 102, the route calculation algorithm 100 initializes a search queue that includes the potential nodes and segments between the origin and destination. The route calculation algorithm 100 assigns every node a cost value of infinity, except for the initial node. The initial node is the node closest to the origin. The route calculation algorithm 100 assigns a cost of zero for the initial node. Additionally, the route calculation algorithm 100 marks all nodes as unvisited, except the initial node, which the route calculation algorithm 100 marks as the current node.

At block 104, the route calculation algorithm 100 retrieves the uncertainty data for the current node from the geographic database 70. The uncertainty data is the cost for the current node. The uncertainty data for the current node includes a mean ($\mu_n$) and a variance ($\sigma_n^2$). In the situation where there are more than one node attribute associated with uncertainty data, the route calculation algorithm 100 combines the cost values relevant for routing.

In one example, the route calculation algorithm 100 is using costs to minimize travel time. The route calculation algorithm 100 identifies relevant segment, node, and transition attributes relevant to the cost function of travel time. The route calculation algorithm 100 combines the costs associated with certain and uncertain segment, node, and transition attributes to get the overall cost value relevant for fastest time routing. If one of these attributes is uncertain, the cost will also be uncertain.

At block 106, the route calculation algorithm 100 identifies all unvisited neighbor nodes to the current node. A neighbor node is a node that is connected to the current node by a single segment. The route calculation algorithm 100 selects a neighbor node to the current node. The route calculation algorithm 100 may select the neighbor node closest to the current node with the highest probability of being included in the route from the origin to the destination.

The route calculation algorithm 100 then retrieves the uncertainty data for the segment between the current node and the selected neighbor node from the geographic database. The uncertainty data is the cost for the segment between the current node and the neighbor node. The uncertainty data for the segment includes a mean ($\mu_s$) and a variance ($\sigma_s^2$). In the situation where there are more than one segment attribute associated with uncertainty data, the route calculation algorithm 100 combines the cost values relevant for routing.

At block 108, the route calculation algorithm 100 calculates the neighbor node cost from the current node cost retrieved at block 104 and the segment cost retrieved at block 106. The route calculation algorithm 100 calculates the neighbor node cost by adding the current node cost and the segment cost. The uncertainty data for the neighbor node includes a mean ($\mu_{n+s} = \mu_n + \mu_s$) and a variance ($\sigma_{n+s}^2 = \sigma_n^2 + \sigma_s^2$).

It is possible that the route calculation algorithm 100 previously calculated a cost for the neighbor node. For example, if the neighbor node (Node B) is located between the current node (Node A) and another node (Node C), the route calculation algorithm 100 may have previous calculated the cost at Node B as the sum of the cost at Node C and the cost for the segment located between Nodes B and C. In this scenario, Node B has a new $Cost_{AB}$ and an old $Cost_{BC}$.

At block 110, the route calculation algorithm 100 determines whether the neighbor node has two costs. If the neighbor node has only one calculated cost (e.g., $Cost_{AB}$), the route calculation algorithm 100 updates the cost at block 116. At block 116, the route calculation algorithm 100 replaces the cost from initialization at block 102 (i.e., infinity) with the node cost calculated at block 108.

If the neighbor node has two costs, at block 112, the route calculation algorithm 100 evaluates cumulative distribution functions using an allowed overall cost value. The route calculation algorithm 100 cannot directly compare the two costs (e.g., new $Cost_{AB}$ and old $Cost_{BC}$) because they are distribution functions. To compare the costs, the route calculation algorithm 100 calculates a cumulative distribution function for each of the costs and then evaluates the cumulative distribution function at an allowed overall cost value, $C_{max}$.

The allowed overall cost value $C_{max}$ is typically entered by a user of the navigation system 10 via the user interface 24. For example, the user may specify a maximum travel time to a destination. In this example, the allowed overall cost value is the specified maximum travel time.

At block 114, the route calculation algorithm 100 determines whether $D_{old}(C_{max}) > D_{new}(C_{max})$. If $D_{old}(C_{max}) > D_{new}(C_{max})$, then the old cost is used (i.e., no cost update is necessary). If the $D_{old}(C_{max}) < D_{new}(C_{max})$, at block 116, the route calculation algorithm 100 updates the cost of the neighbor node by replacing the old cost with the new cost.

After updating the cost at block 116 or determining that a cost update is unnecessary at block 114, the route calculation algorithm 100 marks the current node as visited at block 118.

Then, the route calculation algorithm 100 determines whether there are nodes still marked as unvisited at block 120. If there are no unvisited nodes (i.e., all nodes have been visited) the route calculation algorithm 100 ends at block 122.

If there are still unvisited nodes, at block 124, the route calculation algorithm 100 selects a new current node. The new current node may have the highest probability value that it can be reached within the allowed overall cost $C_{max}$. The route calculation algorithm 100 then continues at block 104.

When route calculation algorithm 100 ends at block 122, the algorithm 100 has identified the route $R_{maxP}$ that maximizes the probability p of reaching the destination (node D) from an origin (node S) within a maximum cost barrier of $C_{max}$. This result can be expressed as follows.

$$p(C_{max}, R_{maxP}, D, S) = \max\{p(C_{max}, R, D, S) | R \text{ is route from } S \text{ to } D\}$$

The route calculation algorithm 100 provides the route to the route guidance application 36 and/or the map display application 38. The user of the navigation system 10 receives probability information along with the route information.

When a node or segment is not associated with uncertainty data, the route calculation algorithm 100 may use a single value cost. For example, the cost can be described as a Dirac delta function, which is zero for all parameter values except one. The standard deviation values are always zero for a Dirac delta function, so its probability values would be either zero or one depending on whether a cost at a node is higher or lower than the allowed overall cost $C_{max}$.

The route calculation algorithm 100 may also be used in multi-modal routing applications. Multi-modal routing involves the use of more than one mode of transportation for a journey. For example, a person wants to go to a theater located in a city center to see a show that starts at 8 pm. While driving to the theater by car, the navigation system 10 receives TMC messages indicating that the journey will take approximately 30 minutes longer than previously estimated. As there is some uncertainty associated with this TMC message, the navigation system 10 computes the overall expected time of arrival by a Gaussian distribution function, with a mean value shortly after 8 pm and a standard deviation of 20 minutes.

The navigation system 10 then searches for public transportation stations that are close to the theatre and the current car position. The navigation system 10 detects that there is a suitable train leaving in 14 minutes from a train station 7 minutes away with a standard deviation of 2 minutes and that this train will be at the destination 7:45 pm. With this information, the user of navigation system 10 may then decide to drive to the train station rather than drive to the theater.

The route calculation algorithm 100 may also be used in energy-efficient routing. The energy consumption for a certain route depends on a large number of factors, such as travel time, number of traffic lights, slope values, weight of vehicle, and so on. A number of these parameters may be associated with uncertainty data represented by a normal distribution function to describe the energy consumption per segment.

The route calculation algorithm 100 may be used to calculate a route that minimizes energy consumption (e.g., gasoline, diesel, electricity, bio-fuel). The route calculation algorithm 100 may also be used to determine how far a hybrid or electric vehicle can travel before it needs to be re-charged. If the navigation system 10 knows the origin, destination, and available energy, the route calculation algorithm 100 may calculate a route $R_{maxP}$ that maximizes the likelihood that the available energy is sufficient, i.e., $p(E_{max}, R_{maxP}, D, S) = \max\{p(E_{max}, R, D, S) | R \text{ is any route from S to D}\}$. Similarly, the route calculation algorithm 100 can compute a route that maximizes the likelihood that 20 gallons of gasoline (or other type of fuel) is enough to travel from an origin to a destination.

The route calculation algorithm 100 may also use a transition cost. For example, there may be a cost for turning left at an intersection. In this example, the cost for a neighboring node may include the cost of transition onto the segment in addition to the segment cost and current node cost.

The route calculation algorithm 100 is based on the Dijkstra algorithm. However, the concept of using a cost function versus a cost value can be applied to other routing algorithms, such as the A* algorithm. The search space explored by the Dijkstra algorithm is a circle around the current position of the navigation system 10. In order to reduce the search space, the A* algorithm takes the Euclidean distance into consideration.

The route calculation algorithm adds the Euclidean cost for each node with a probability value at the Euclidean distance $\mu_{ND\_Euclidean}$ between node N and node D. The sum of the network cost from the start node S to node N $C_{SN\_network}$ ($\mu_{SN\_network}$, $\sigma_{SN\_network}^2$) and the Euclidean Cost $C_{ND\_Euclidean}(\mu_{ND\_Euclidean}, 0)$ form the cost of node N, i.e., $C_N(\mu_N, \sigma_N^2)$ where $\mu_N = \mu_{SN\_network} + \mu_{ND\_Euclidean}$ and $\sigma_N^2 = \sigma_{SN\_network}^2$.

V. Conclusions

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for route calculation, the method comprising:
    at a navigation system, receiving a destination;
    the navigation system calculating a route from a current position to the destination, wherein the route is a sequence of road segments;
    retrieving data indicative of a geographic position for at least one road segment from a geographic database associated with the navigation system;
    retrieving a distribution function for an attribute describing the at least one road segment from the geographic database associated with the navigation system, wherein the attribute is different than the geographic position, wherein the distribution function represents uncertainty that the attribute is accurate; and
    providing an output that includes information about the uncertainty in the route.

2. The method of claim 1, wherein the distribution function is a normal distribution function.

3. The method of claim 1, wherein the output includes a probability value of arriving at the destination before a certain time.

4. The method of claim 1, wherein the output includes a probability value that a first route is faster than a second route.

5. The method of claim 1, wherein the output includes a travel time estimate displayed as a distribution function.

6. The method of claim 1, wherein the output includes an estimated arrival time as a distribution function.

7. The method of claim 1, wherein the distribution function represents uncertainty in a slope value stored in the geographic database.

8. The method of claim 1, wherein the distribution function represents uncertainty in historic traffic data stored in the geographic database.

9. The method of claim 1, wherein the distribution function represents uncertainty in a public transportation schedule stored in the geographic database.

10. The method of claim 1, wherein the distribution function represents uncertainty in a speed category value stored in the geographic database.

11. The method of claim 1, wherein the distribution function represents uncertainty in traffic related data.

12. A computer-implemented method for route calculation, the method comprising:
    receiving an origin and a destination;
    calculating a route from the origin and the destination using a probability-based routing algorithm based on geographic position data and an uncertainty cost that describes an accuracy of data for at least one attribute of a road segment, wherein the attribute is different than the geographic position data, along the route; and
    providing probability information regarding the route.

13. The method of claim 12, wherein the routing algorithm calculates the uncertainty cost for a neighbor node by adding the uncertainty cost of a current node and the uncertainty cost of a segment connecting the neighbor node and the current node.

14. The method of claim 13, wherein the routing algorithm uses an allowed overall cost value to select an uncertainty cost when the neighbor node is associated with two uncertainty costs.

15. The method of claim 12, wherein the uncertainty cost includes a mean value and a variance value.

16. The method of claim 12, wherein the route is a multi-modal route.

17. The method of claim 12, wherein the probability information includes a probability that a vehicle can reach the destination without re-fueling or re-charging.

18. The method of claim 12, wherein the probability information includes a distribution function.

19. The method of claim 12, wherein the probability information includes a mean value and a standard deviation.

20. The method of claim 12, wherein the uncertainty cost represents uncertainty in a slope value stored in the geographic database, uncertainty in historic traffic data stored in the geographic database, uncertainty in a public transportation schedule stored in the geographic database, or uncertainty in a speed category value stored in the geographic database.

21. A computer-implemented method for route calculation, the method comprising:
    receiving an origin and a destination;
    calculating a route from the origin and the destination using a probability-based routing algorithm based on an uncertainty cost that describes an accuracy of data for at least one attribute of a road segment along the route; and
    providing probability information regarding the route, wherein the uncertainty cost represents uncertainty in a slope value stored in a geographic database, uncertainty in historic traffic data stored in the geographic database, uncertainty in a public transportation schedule stored in the geographic database, or uncertainty in a speed category value stored in the geographic database.

22. A computer-implemented method for route calculation, the method comprising:
- at a navigation system, receiving a destination;
- the navigation system calculating a route from a current position to the destination, wherein the route is a sequence of road segments;
- retrieving a distribution function for an attribute associated with a road segment from a geographic database associated with the navigation system, wherein the distribution function represents uncertainty; and
- providing an output that includes information about the uncertainty in the route, wherein the distribution function represents uncertainty in a slope value stored in the geographic database, uncertainty in historic traffic data stored in the geographic database, uncertainty in a public transportation schedule stored in the geographic database, or uncertainty in a speed category value stored in the geographic database.

23. A method, further comprising:
- receiving a destination;
- calculating a route from a current position to the destination, wherein the route is a sequence of road segments;
- retrieving geographic position data for at least one road segment from a geographic database associated with the navigation system;
- retrieving a distribution function for an attribute associated with at least one road segment from the geographic database associated with the navigation system, wherein the distribution function represents uncertainty that the attribute is accurate; and
- providing an output that includes information about the uncertainty in the route,
- wherein the distribution function represents uncertainty in a slope value stored in the geographic database, uncertainty in historic traffic data stored in the geographic database, uncertainty in a public transportation schedule stored in the geographic database, or uncertainty in waiting time to cross an intersection.

24. The method of claim 1, wherein the distribution function represents uncertainty in historical data stored in the geographic database.

* * * * *